US007605488B2

United States Patent
Rebsdorf

(10) Patent No.: US 7,605,488 B2
(45) Date of Patent: Oct. 20, 2009

(54) METHOD FOR ELIMINATING THE IMPACT OF BACKLASHES IN THE GEARBOX OF A WIND TURBINE

(75) Inventor: Anders Rebsdorf, Silkeborg (DK)

(73) Assignee: Gamesa Innovation & Technology, S.L., Pamplona (ES)

( * ) Notice: Subject to any disclaimer, the term of this patent is extended or adjusted under 35 U.S.C. 154(b) by 144 days.

(21) Appl. No.: 12/011,995

(22) Filed: Jan. 30, 2008

(65) Prior Publication Data

US 2008/0179886 A1 Jul. 31, 2008

(30) Foreign Application Priority Data

Jan. 31, 2007 (ES) .................... 200700248

(51) Int. Cl.
*F03D 7/00* (2006.01)
(52) U.S. Cl. .................. 290/44; 290/55
(58) Field of Classification Search ............ 290/44
See application file for complete search history.

(56) References Cited

U.S. PATENT DOCUMENTS

| 4,511,807 | A * | 4/1985 | Somerville | 290/44 |
| 6,574,535 | B1 * | 6/2003 | Morris et al. | 701/22 |
| 7,276,807 | B2 * | 10/2007 | Luetze et al. | 290/44 |
| 7,352,075 | B2 * | 4/2008 | Willey et al. | 290/44 |
| 2007/0100506 | A1 * | 5/2007 | Teichmann | 700/297 |
| 2007/0246943 | A1 * | 10/2007 | Chang et al. | 290/44 |
| 2008/0084070 | A1 * | 4/2008 | Teichmann et al. | 290/55 |
| 2008/0191836 | A1 * | 8/2008 | Wobben | 338/289 |
| 2009/0075771 | A1 * | 3/2009 | Tesar | 475/5 |

FOREIGN PATENT DOCUMENTS

WO WO 2008131778 A2 * 11/2008

* cited by examiner

*Primary Examiner*—Joseph Waks
(74) *Attorney, Agent, or Firm*—Jadas and Parry LLP

(57) ABSTRACT

Method for operating a wind turbine comprising a drive train driving one or more electrical generators that supply power to an electric grid, by which, in events that can create a load inversion in the gearbox, a drive train dump load is activated for ensuring that the drive train torque has a constant direction, avoiding the impact of backlashes in the gearbox, the dump load including of power absorbed by one or several systems specifically dedicated to the absorption of the dump load and present at the wind turbine for other purposes.

12 Claims, 2 Drawing Sheets

METHOD FOR ELIMINATING THE IMPACT OF BACKLASHES IN THE GEARBOX OF A WIND TURBINE

FIELD OF THE INVENTION

The invention relates to a method for eliminating the impact of backlashes in the gearbox of a wind turbine and to a wind turbine having means for implementing such method.

BACKGROUND

Wind turbine gearboxes need to have a certain gap between its components for several purposes such as avoid interference, wear, and excessive heat generation, ensure proper lubrication or compensate for manufacturing tolerances. Said gaps cause that at a load reversal the output shaft will turn a slight angle even though the input shaft is not rotating. The value of the shaft "turn angle at zero load" is called the rotational backlash of the gearbox.

If the main shaft torque in the gearbox is zero, then the forces acting in the gear mesh will be approximately zero. Then there will be no tension of the drive train and some backlash will be present.

If the main shaft torque in the gearbox increase larger than approximately zero then the forces acting in the gear mesh will act in only one direction and the drive train will be aligned and tension will increase.

If the main shaft torque in the gearbox decrease below approximately zero then the forces acting in the gear mesh will act in only one direction, but now in an opposite direction and the drive train will be aligned and tension will increase.

In wind turbines it is known that the dynamic impacts induced by periodic load inversions, i.e. backlash fenomena, propagate through the drive train and can be amplified due to the excitations introduced by rotor and generator torque variations so that they may cause the failure of the wind turbine drive train.

Due to the variations of rotor and generator torques, the drive train is excited dynamically producing a permanently varying pretension. In certain states the pretension of the drive train is completely released or even inversed. The inversion of the pretension produces backlashes which can amplify due to the excitations introduced by the varying rotor and generator torque.

Another drawback of backlashes is that they are an important source of noise.

To the applicant knowledge it is not known prior art specifically addressed to overcome the difficulties with backlashes in wind turbines. There is indeed prior art teaching the use of generator torque control means and pitch control means for reducing the drive train loads in normal operational states and also prior art teaching the use of torque limiting devices in special wind situations such as in the event of gusts, but it is not known prior art focused in avoiding idling situations where the torque is random and shifting in direction with different unwanted potential consequences, including the production of noise.

SUMMARY OF THE INVENTION

An object of the present invention is to provide a method for operating a wind turbine for eliminating the impact of backlashes in the gearbox.

This and other objects are met by providing a method for operating a wind turbine comprising a drive train driving one or more electrical generators that supply power to an electric grid, the drive train including a rotor hub, to which one or more blades are attached, a main shaft, a gearbox and connecting shafts to said one or more electrical generators that, in events that can create a load inversion in the gearbox, a drive train dump load is activated for ensuring that the drive train torque has a constant direction, avoiding the impact of backlashes in the gearbox, said dump load consisting of power absorbed by one or several means chosen among means specifically dedicated to the absorption of said dump load and means present at the wind turbine for other purposes.

One advantage of this method is that if the gearbox do contain a planetary stage or more planetary stages it is advantageous to keep a constant direction of the tension, as the positioning of the sun wheel then gets normal operating conditions which improves the gearbox lifetime and allows optimized designs. For other types of gear stages in a gearbox, such as a parallel shaft gear stage, especially the helical ones, the advantage is not just the fatigue reduction of the teeth, but also the reduction in the variations of the axial forces put to the bearings, those axial forces are created by the torque changes in the helical stage.

Another advantage of this method is that the acoustic emission will be less as the rattle from the presence of the backlash will no longer emit any sound.

In an embodiment of this invention the dump load is activated in the event of the wind turbine start up avoiding load inversions in the drive train during this operation.

In another embodiment of this invention the dump load is activated in the event of the disconnection of the wind turbine from the grid facilitating a smooth disconnection procedure.

In another embodiments of this invention, the dump load is activated in different events in which the operational state of the wind turbine is a transient state facilitating that the wind turbine may ride-through them improving the power production.

Another object of the present invention is to provide a wind turbine for implementing the above-described method.

This and other objects are met by providing a wind turbine comprising a drive train driving one or more electrical generators that supply power to an electric grid, the drive train including a rotor hub, to which one or more blades are attached, a main shaft, a gearbox and connecting shafts to said one or more electrical generators that also comprises power absorption means for generating a drive train dump load which is used for ensuring that the drive train torque has a constant direction, avoiding the impact of backlashes in the gearbox, said power absorption means being chosen among means specifically dedicated to the absorption of said dump load and means present at the wind turbine for other purposes.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
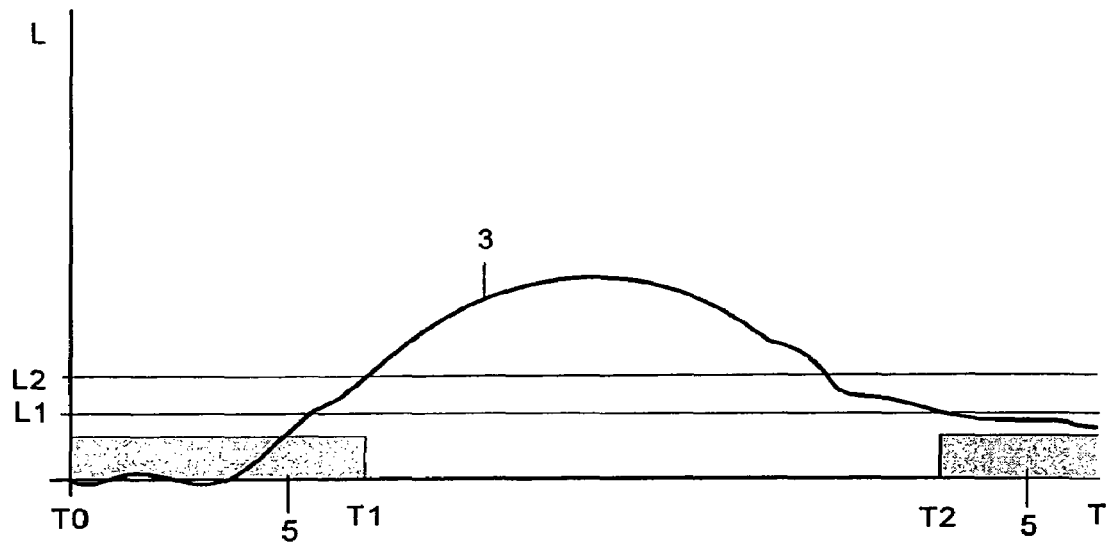
FIG. 1 is a schematic diagram illustrating the method of this invention in two events: the wind turbine start up and a low wind situation.

FIG. 1 (Time T in x-axis, Drive Train Torque L in y-axis) shows a typical evolution of the load 3 in the gearbox of a wind turbine in two events that can cause difficulties with backlashes: a wind turbine start-up, occurring from time T0 to time T1, and a low wind situation, beginning in time T2.

According to this invention an adequate dump load 5 is partly or fully activated, depending on the type of the dump load being used, in both events.

At start-up the dump load 5 is activated for loading the drive train at the generator side of the gearbox. When the main shaft starts rotating it will be loaded to some extent by the dump load 5, the drive train will be aligned and there will be a well defined tension in it. Otherwise there will be torque shifts as shown in FIG. 1.

When conditions are adequate the generator will start to deliver active electrical power to the grid, and the dump load 5 will still be activated to some extent. When main shaft torque is above a predetermined torque level L2 the dump load 5 is partly or fully deactivated, depending on the type of dump load being used, and no dump load related loss in energy yield will occur.

In a low wind situation, the main shaft torque may be below a certain level that may cause problems. In such event, when the main shaft torque is below a predetermined torque level L1, the dump load 5 is partly or fully activated which ensures good tension and working conditions for the drive train and the gearbox.

Figure 2:
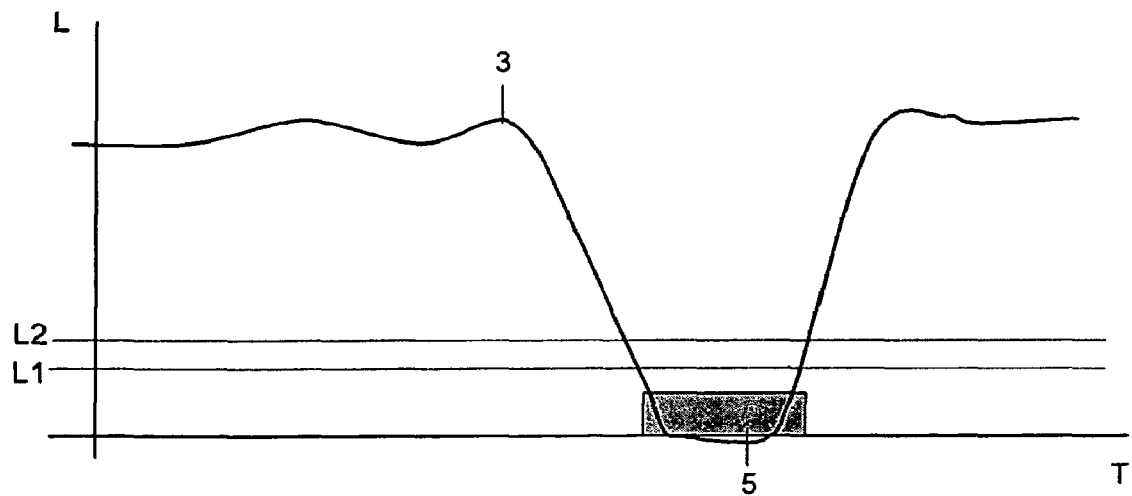
FIG. 2 is a schematic diagram illustrating the method of this invention in the event of a shift from star to delta, or the opposite, generator connection to the grid.

FIG. 2 (Time T in x-axis, Drive Train Torque L in y-axis) shows a typical evolution of the load 3 in the gearbox of a wind turbine when the generator coupling state changes, i.e. from "star" to "delta" coupling or the opposite, an event that may cause torque shifts. In this event, according to this invention, when the main shaft torque is below a predetermined torque level L1, the dump load 5 is partly or fully activated and when the main shaft torque is above a predetermined torque level L2 the dump load 5 is partly or fully deactivated, and no dump load related loss in energy yield will occur.

According to this invention, the activation of a dump load when the main shaft torque is below a predetermined torque level L1 and, if required, the deactivation of a dump load when the main shaft torque is above a predetermined torque level L2 shall be done in any event that can cause load inversions in the drive train such as the following:

Wind turbine fault situations where a transition from a normal operation state into a fault state is needed.
Grid fault situations where a transition from a normal operation state into a fault state is needed.
Grid abnormal conditions such as a "ride-through" sequence where the wind turbine shall continue to deliver power to the grid when the grid fault has been cleared.

There are events in which the method according to this invention includes an additional action to the activation of a dump load. One of these events is a disconnection of the wind turbine at a wind speed higher than cut-out wind speed (sometimes called stop wind). In this case, the speed controller would normally bring the rotor to standstill and the blade pitch angle references will be set to 90 deg. Doing so the rotor will be left oscillating in direction and the activation of the chosen dump load may be insufficient for ensuring the drive train tension. So, in this case, the method according to this invention includes also an action for keeping the rotor speed above a predetermined value, for example setting the pitch angle reference to less than 90 deg.

Another event in which the method according to this invention includes an additional action to the activation of a dump load is a shift from "star" to "delta", or the opposite, generator connection to the grid. In this event the method according to this invention includes the acceleration of the drive train as a way to ensure the tension of the drive train. So just before torque is effectively zero, some acceleration of the drive train is ensured by the speed controller and after a short instant—seconds—the shift in generator connection must be carried out and the speed controller can again act normally.

As it has been said, there are many types of dump loads for implementing the method according to this invention.

Suitable dump loads for any type of wind turbine are the following:
Heat from friction in the existing brake.
Heat from shaft friction ex. from a shaft mounted fan
Power absorbed and transferred to a energy storage of a kind with the purpose to be recaptured later, using means such as a battery and a battery charger, a flywheel and an electrical machine, a tank and a pump and some pressure tanks and a fuel cell system.

Suitable dump loads for any type of wind turbine in grid connected state are the following:
Power delivered to the grid.
Heat energy from loss in resistor connected to generator or converter.
Heat energy from extra activation of the loss in wind turbine auxiliary components as pumps and fans.
Heat energy in generator caused by extra generator losses due to circulation of extra reactive current.

Figure 3:
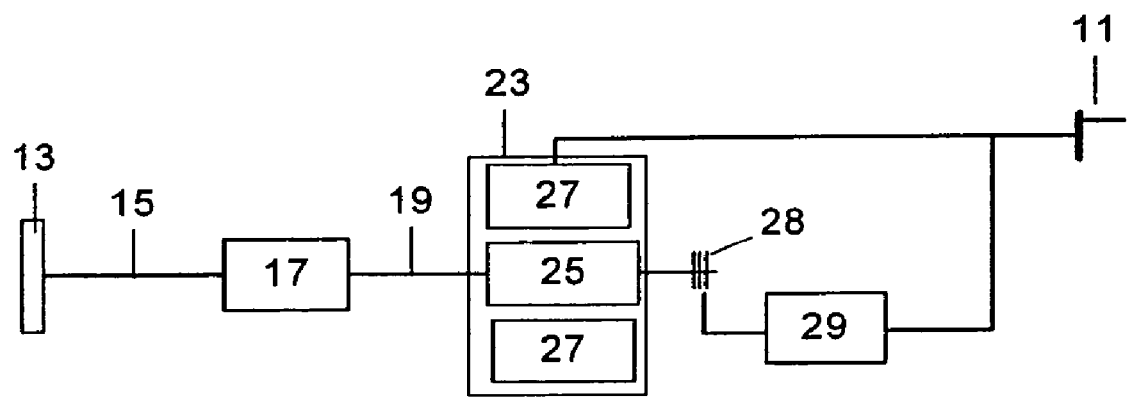
FIG. 3 is a block diagram of a wind turbine with a doubly feed converter for implementing the method of this invention.
Figure 4:
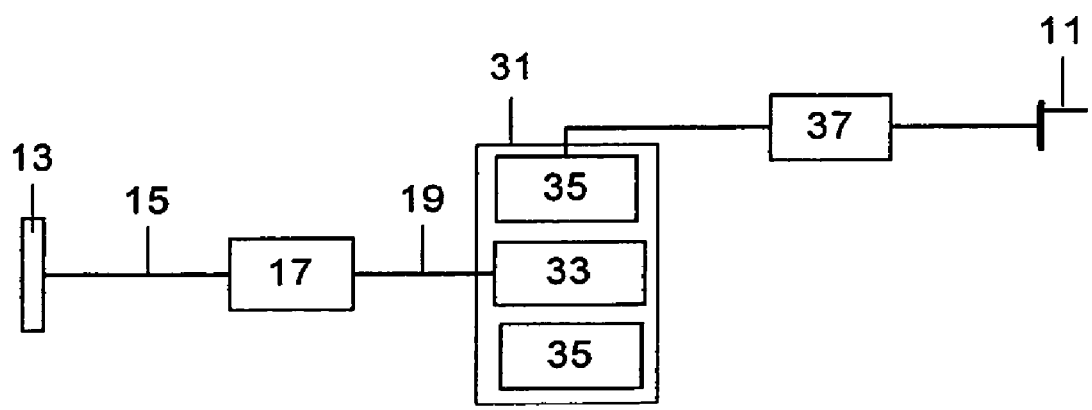
FIG. 4 is a block diagram of a wind turbine with a full converter for implementing the method of this invention.

FIGS. 3 and 4 shows schematically two types of wind turbine widely used these days: a wind turbine with doubly feed converter and a wind turbine with full converter. In both cases the wind turbine comprises a drive train driving an electrical generator that supplies power to an electric grid 11 through a power electronics unit, the drive train including a rotor hub 13, to which one or more blades are attached, a main shaft 15, a gearbox 17 and a connecting shaft 19 to the electrical generator.

The invention is also applicable to other types of wind turbines, particularly to wind turbines having two or more electrical generators.

FIG. 3 shows a wind turbine having a wound-rotor induction generator 23, with rotor 25 and stator 27 which is connected to the grid 11 through a IGBT-based and PWM electronic control converter 29 through sliprings 28.

A suitable dump load for this type of wind turbine in grid connected state is power delivered to the grid.

Another suitable dump load for this type of wind turbine in grid connected state is heat energy from generator 23 losses produced by presence of added reactive current in the generator 23.

Another suitable dump load for this type of wind turbine in grid disconnected state for the event of a change of the generator 23 coupling state from "star" to "delta" or the opposite is in parallel to the active power deloading of the generator to let the speed of the shaft accelerate which will make the torque in the gearbox having a constant positive value caused by the torque it takes to spin up the generator inertia.

FIG. 4 shows a wind turbine having a synchronous generator ex. a permanent magnet generator 31 with rotor 33 and stator 35 which is connected to the grid 11 through a full converter unit 37.

A suitable dump load for this type of wind turbine in grid connected state is power delivered to the grid.

Another suitable dump load for this type of wind turbine in grid connected state is heat energy from generator 31 losses produced by presence of added reactive current in the generator 31. These losses may be produced by means of a control of the converter 37 modules setting that one half of the converter modules (module 1, 2 and 3) gets an additional reactive power reference of Qref.sys1, and the rest (module 4, 5 and 6) get an additional reactive power reference of –Qref.sys1, so the overall influence towards the total reactive production is unchanged from the normal performance, but the heat loss in the generator is changed radically. This will work just as a dump load without any extra components, but through some change in the generator control software. Further it will react very fast—a few ms—and hence also be interesting for dynamic damping purposes in the drive train.

Another suitable dump load for this type of wind turbine in grid disconnected state is heat energy from generator 31 dissipated in a resistor that could be also used as a dump load to absorb generator production during grid faults.

Although the present invention has been fully described in connection with preferred embodiments, it is evident that modifications may be introduced within the scope thereof, not considering this as limited by these embodiments, but by the contents of the following claims.

The invention claimed is:

1. Method for operating a wind turbine comprising a drive train driving one or more electrical generators (23, 31) that supply power to an electric grid (11), the drive train including a rotor hub (13), to which one or more blades are attached, a main shaft (15), a gearbox (17) and connecting shafts (19) to said one or more electrical generators (23, 31), characterized in that, in events that can create a load inversion in the gearbox (17), a drive train dump load (5) is activated for ensuring that the drive train torque has a constant direction, avoiding the impact of backlashes in the gearbox (17), said dump load (5) consisting of power absorbed by one or several means chosen among means specifically dedicated to the absorption of said dump load (5) and means present at the wind turbine for other purposes.

2. Method for operating a wind turbine according to claim 1, characterized in that one of said events is the wind turbine start up and in that said dump load (5) is activated at the beginning of the start up and it is deactivated when the drive train torque is above a predetermined value L2.

3. Method for operating a wind turbine according to claim 1, characterized in that one of said events is a low wind situation and in that said dump load (5) is activated when the drive train torque is below a predetermined value L1 and it is deactivated when the drive train torque is above a predetermined value L2.

4. Method for operating a wind turbine according to claim 1, characterized in that one of said events is a change of the generator coupling state and in that said dump load (5) is activated when the drive train torque is below a predetermined value L1 and deactivated when the drive train torque is above a predetermined value L2.

5. Method for operating a wind turbine according to claim 4, characterized in that, in addition or in substitution to the use of said dump load (5), an acceleration of the rotor (13) is carried out just before the drive train torque value is zero.

6. Method for operating a wind turbine according to claim 1, characterized in that one of said events is any event in which the operational state of the wind turbine is a transient state due to a grid fault or a wind turbine fault and in that said dump load (5) is activated when the drive train torque is below a predetermined value L1 and deactivated when the drive train torque is above a predetermined value L2.

7. Method for operating a wind turbine according to claim 1, characterized in that one of said events is the generator (23, 31) disconnection from the grid (11) and in that said dump load (5) is activated when the drive train torque is below a predetermined value L1.

8. Method for operating a wind turbine according to claim 7, characterized in that in the event of a disconnection from the grid (11) at a high wind speed in addition to the activation of the dump load (5), the rotor (13) speed is kept above a predetermined value R1.

9. Wind turbine for implementing a method according to claim 1, comprising a drive train driving one or more electrical generators (23, 31) characterized in that it also comprises power absorption means for generating a drive train dump load (5) which is used for ensuring that the drive train torque has a constant direction, avoiding the impact of backlashes in the gearbox, said power absorption means being chosen among means specifically dedicated to the absorption of said dump load (5) and means present at the wind turbine for other purposes.

10. Wind turbine according to claim 9, characterized in that said power absorption means include one or more of the following:

the wind turbine brake, wind turbine pumps and wind turbine fans;

a resistor connected to the generator.

11. Wind turbine according to any of claims 9-10 claim 1, characterized in that said one or more electric generators are wound-rotor induction generators (23) which are connected to the grid through a IGBT-based and PWM electronic control converter (29) and in that said power absorption means also include one or more of the following:

the generator (23) configuration producing additional power when the generator (23) connected to the grid (11);

a resistor connected to the converter (29) or to the generator (23);

a parallel circuit connected to the generator (23), when the generator (23) is not connected to the grid (11).

12. Wind turbine according to claim 9-10, characterized in that said one or more electric generators are synchronous generators (31) connected to the grid through a full converter unit (37) and in that said power absorption means also include one or more of the following:

a converter (37) configuration producing additional power or additional generator (31) losses when the generator (31) is connected to the grid (11).

a resistor connected to the generator (31), when the generator (31) is not connected to the grid.

* * * * *